US006189382B1

(12) United States Patent
Johnson

(10) Patent No.: US 6,189,382 B1
(45) Date of Patent: Feb. 20, 2001

(54) VIBRATORY SENSOR WITH SELF-CALIBRATION AND LOW NOISE DIGITAL CONVERSION

(75) Inventor: Gregory M. Johnson, Goleta, CA (US)

(73) Assignee: Litton Systems, Inc., Woodland Hills, CA (US)

( * ) Notice: Under 35 U.S.C. 154(b), the term of this patent shall be extended for 0 days.

(21) Appl. No.: 09/434,566

(22) Filed: Nov. 5, 1999

(51) Int. Cl.[7] .................................................. G01C 19/00
(52) U.S. Cl. ........................................................ 73/504.13
(58) Field of Search ........................... 73/504.13, 504.12, 73/504.02

(56) References Cited

U.S. PATENT DOCUMENTS

| 5,540,094 | * | 7/1996 | Varnham et al. | 73/504.13 |
| 5,760,304 | * | 6/1998 | Lynch | 73/504.13 |
| 5,763,780 | * | 6/1998 | Matthews et al. | 73/504.13 |
| 5,801,310 | * | 9/1998 | Matthews et al. | 73/504.13 |
| 5,817,940 | * | 10/1998 | Kobayashi et al. | 73/504.12 |
| 5,827,966 | * | 10/1998 | Lynch et al. | 73/488 |
| 5,902,930 | * | 5/1999 | Matthews et al. | 73/504.02 |
| 5,915,276 | * | 6/1999 | Fell | 73/504.13 |
| 6,065,340 | * | 5/2000 | Matthews et al. | 73/504.13 |
| 6,079,270 | * | 6/2000 | Matthews et al. | 73/504.02 |

* cited by examiner

Primary Examiner—Richard A. Moller
(74) Attorney, Agent, or Firm—Price and Gess

(57) ABSTRACT

A vibratory sensor, such as for example a hemispherical resonator gyroscope (HRG) operating in the whole angle mode, is disclosed with a self-calibrating function and an improved precision. Precision is improved using two multiplying low noise DACs to estimate the position of the standing wave relative to a fixed position on the HRG. During a first half cycle the DACs multiply a measured standing wave position by an estimated standing wave position, such that the product of the two signals approach zero. The small voltage output can then be amplified using high gain to minimize the noise in the standing wave angle prediction. Using an ADC, the amplified signal is converted and transmitted to a microprocessor for evaluation. In the second half cycle, the low noise multipliers are evaluated using a known reference signal, where the product of the known reference signal and the multipliers are evaluated against a predicted signal to determine multiplier drift. Subsequently, future estimations of the standing wave precess angle are processed using the evaluation of the multipliers, thereby establishing a self-calibration mode.

20 Claims, 4 Drawing Sheets

VIBRATORY SENSOR WITH SELF-CALIBRATION AND LOW NOISE DIGITAL CONVERSION

BACKGROUND OF THE INVENTION

1. Field of the Invention

The present invention relates to the field of vibratory sensors, for example, hemispherical resonator gyroscopes ("HRG"s), and more particularly to a vibratory sensor with a self-calibrating feature and a low noise digital conversion to improve the performance of the sensor.

2. Description of Related Art

Vibratory sensors for measuring are known in the art for measuring an angular rate of a body about a predetermined axis. These sensors are of critical importance in space applications, such as the orienting of satellites and space vehicles. Sensors such as hemispherical resonator gyroscopes ("HRGs") are reliable and have a long active life, making the gyro especially suited for this purpose. The present invention, while particularly well suited for HRG applications, is readily adaptable to other types of sensors where an oscillating member conveys a signal to be interpreted at very high accuracy.

An HRG is typically comprised of a forcer electrode assembly, a hemispherical thin-walled quartz shell, and a pick-off electrode assembly joined together with a rare-earth metal such as indium. The unit is housed in a vacuum chamber with electrical feeds to communicate voltage signals from the gyro to a microprocessor for interpretation. The general operation of the gyroscope is discussed in the Letters Patent to Loper, Jr. et al., U.S. Pat. No. 4,951,508, which is fully incorporated herein by reference.

The hemispherical resonator 101 is a bell-shaped thin walled structure with a rim that can be made to deform from a circular profile to an elliptical profile when subjected to certain external electrical fields. The resonator is supported by an integral stem which itself is supported by the housing for the pick-off and forcer electrodes. By applying a cyclical forcing voltage, a standing wave pattern can be established in the resonator. To establish the standing wave, the hemispherical resonator is initially biased at a voltage of known magnitude, and then a varying electrical field is applied at the forcer electrodes. If the forcer electrodes apply the appropriate varying electrical field at angular intervals of 90 degrees, the resonator will flexure in a standing wave such as that shown in FIG. 1.

The primary harmonic resonating wave has four nodes a,b,c,d and four antinodes e,f,g,h around the perimeter of the resonator, alternating and equal spaced forty-five degrees apart. Nodes are points on the standing wave where displacement is a minimum, and antinodes are points on the standing wave where displacement is a maximum. Operation of the HRG requires precise tracking of the standing wave movement, which in turn requires that the location of the nodes and antinodes be accurately determined.

It is a physical property of the gyroscope that if an unrestrained resonator is rotated about an axis normal to the page (see FIG. 2), the standing wave will precess in an opposite direction to the original rotation due to Coriolis force. Moreover, the amount of the angular precess will be 0.3 times the angular displacement of the resonator, where 0.3 is a geometric property of the resonator's hemispherical shape and holds constant for any rotation angle and any rotation rate. For example, if the resonator of FIG. 1 is rotated ninety degrees in the counter-clockwise direction, as indicated by the angular displacement of the notch 201, the standing wave will precess twenty-seven degrees clockwise as shown in FIG. 2. In this manner when an HRG is rotated about its primary axis, by measuring the change in the angular position of the standing wave information about the rotation of the HRG can be determined.

The position of the standing wave both before and after the rotation of the gyroscope is determined by the pick-off electrodes positioned about the external annular component of the housing. By measuring the capacitance across the gap formed between the pick-off electrodes and the resonator, the distance across the gap can be accurately determined. This information is processed by a microprocessor in a manner such that the exact position of the standing wave is determined. By measuring the change in position of the standing wave, the rotation of the gyro can readily be determined.

The HRGs operate in one of two modes - whole angle mode and force rebalance mode. In whole angle mode, the standing wave is allowed to precess unhindered under the influence of the Coriolis force caused by the rotation of the gyro as just described. The instantaneous position of the standing wave is evaluated by computing the arctangent of the ratio of the amplitude of the two pickoff signals. The gyro's dynamic range is limited solely by the resolution and processing of the pickoff signal estimation.

In the force rebalance mode, the standing wave is constrained such that it does not precess under the influence of the Coriolis force, and the magnitude of the restraining force is used to calculate the rotation rate of the gyro. In this mode, an additional forcing signal is included which holds the standing wave at a fixed azimuthal location. The amount of force necessary to maintain the standing wave fixed is proportional to the input rotational rate. For force rebalance gyros, the case-oriented control and readout processing is eliminated, and the output noise performance can be optimized because the dynamic range requirements of the pick-off signal estimation are greatly reduced.

When operating in a whole angle mode, the prior art HRG typically operated as follows with reference to FIG. 3. Voltages from four pick-off electrode pairs 100 deliver an output each having a sinusoidal function. The signals are multiplied by a fixed excitation voltage, such that the signals take the form:

$$V_1 = A \cos(\omega t) \cos(\theta)$$

$$V_2 = -A \cos(\omega t) \cos(\theta)$$

$$V_3 = A \cos(\omega t) \sin(\theta)$$

$$V_4 = -A \cos(\omega t) \sin(\theta)$$

where A is the product of the excitation voltage across the pickoff gap and the ratio of the radial displacement of the resonator at the antinode relative to the pickoff gap, $\omega$ is the natural frequency of the resonator for the given conditions, and $\theta$ is the precession angle of the standing wave. Signals $V_1$ and $V_2$ are differenced to form a resultant 'cosine' signal $S_1$ and signals $V_3$ and $V_4$ are differenced to form a resultant 'sine' signal $S_2$. These two differential outputs of the gyro are routed to a two channel multiplexor 100 so that only one digital conversion process is required. The output of the multiplexor is summed with the output of a conventional 18 bit digital-to-analog (DAC) converter 120 which has been commanded to the estimate of the negative of the positive peak value of the signal being addressed by the multiplexor.

The signal 110 is subsequently amplified (Gain) 130 and then sampled by a sixteen bit analog-to-digital converter (ADC) 140. The ADC 140 samples the combined signal once at the time of the peak of the signal. In the same manner the negative peak of the same gyro signal is processed according to the above description. The DAC 120 commands and the ADC values are combined to compute the estimate of the gyro standing wave pattern using a formula such as:

$$\theta_{estimate} = \text{ARCTANGENT} ((\text{Sin\_DAC\_command}*\text{Gain} + \text{Sin\_ADC\_output}) / \text{Cos\_DAC\_command}*\text{Gain} + \text{Cos\_ADC\_output})).$$

The above described circuit has inherent limitations which are undesirable. For example, the performance of the above-described HRG is limited by the noise of the DAC 120, which typically only has an effective accuracy of 16 bits. Furthermore, the DAC linearity is also only 16 bits, and the effective low sample rate which generates unwanted noise (due to the alias of the higher frequency noise signals) cannot be analog filtered out of the signal prior to sampling, further contributing to the degradation of the HRG's performance. In view of the limitations of the prior art, what is needed is a low noise, moderate bandwidth resolver to digital converter with a higher bit accuracy than the previous art.

OBJECTS AND SUMMARY OF THE INVENTION

The present invention is directed to an improved hemispherical resonator gyroscope operating in whole angle mode, said gyro operating with lower noise, higher resolution, higher bandwidth, and higher accuracy than HRGs of the prior art. The present invention achieves these advantages by implementing a pair of low noise digital-to-analog four quadrant multipliers and a digital pulse width modulator to the circuitry of the HRG. The multipliers are used to converge the estimate of the standing wave precess angle by minimizing the difference between the actual precess angle and an estimated angle, and then amplifying the difference to maximize the precision. In a parallel function, the multipliers are calibrated in an off cycle mode using the pulse width modulator (pwm). The invention design allows for the calibration of the bias and scale factor of the pwm digital-to-analog converter.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a low noise, high accuracy vibratory sensor with self-calibration.

Figure 1:
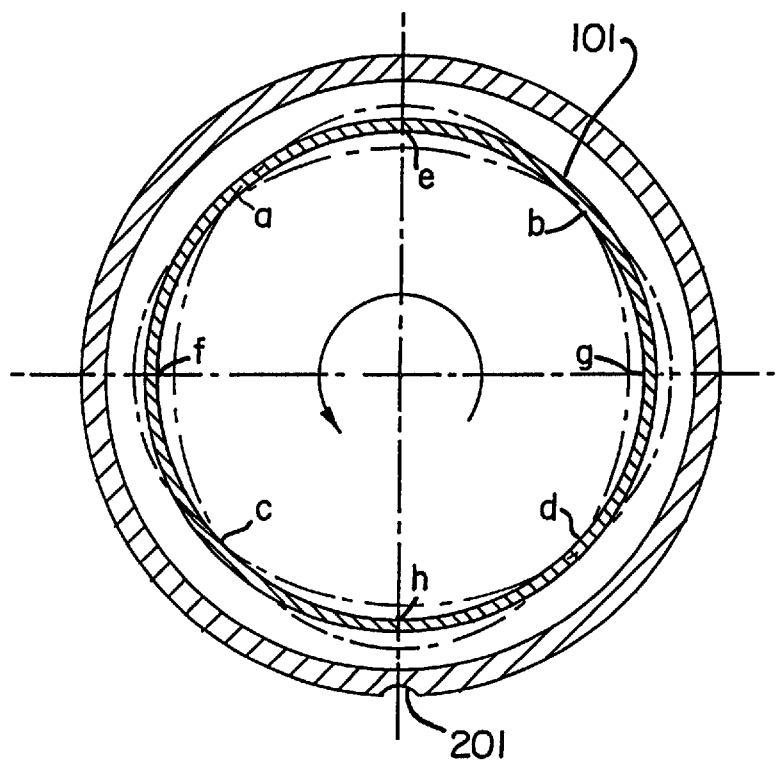
FIG. 1 is an illustration of a standing wave pattern typical of a hemispherical resonator gyroscope.
Figure 2:
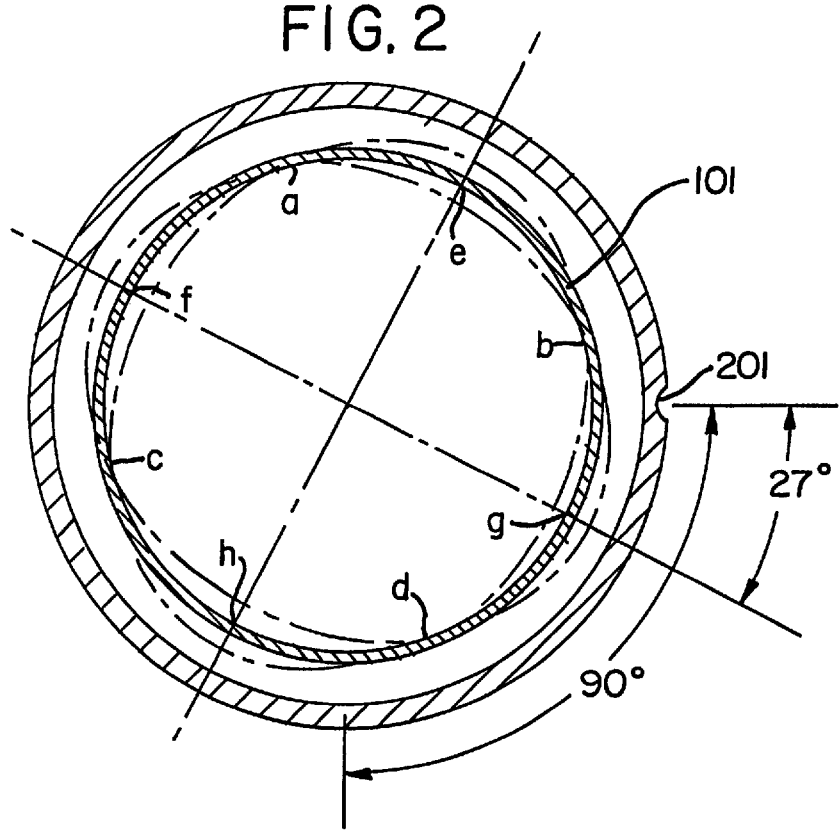
FIG. 2 is an illustration of a standing wave pattern of FIG. 1 after a rotation of the HRG ninety degrees in the counterclockwise direction.
Figure 3:
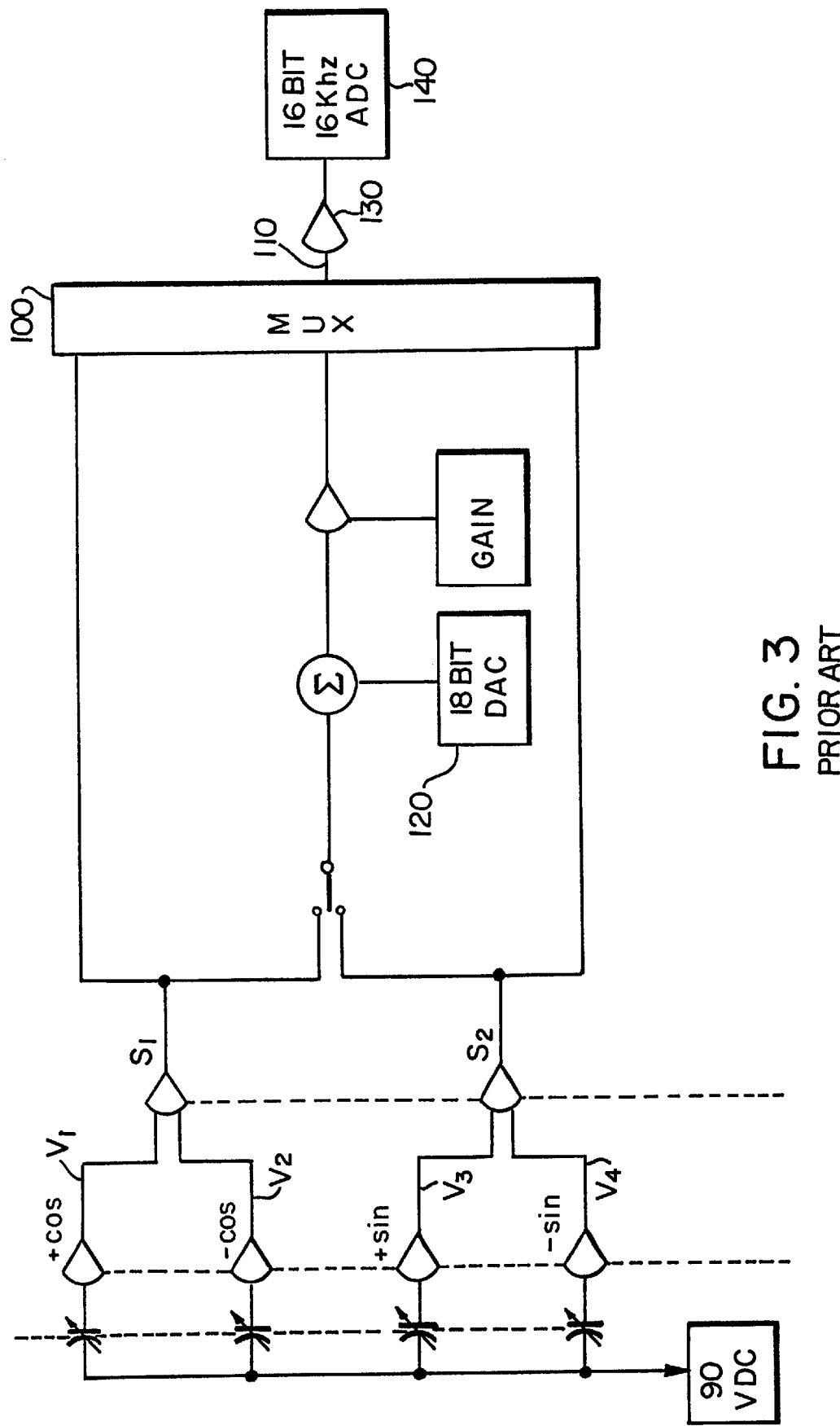
FIG. 3 is a schematic diagram of a HRG of the prior art.
Figure 4:
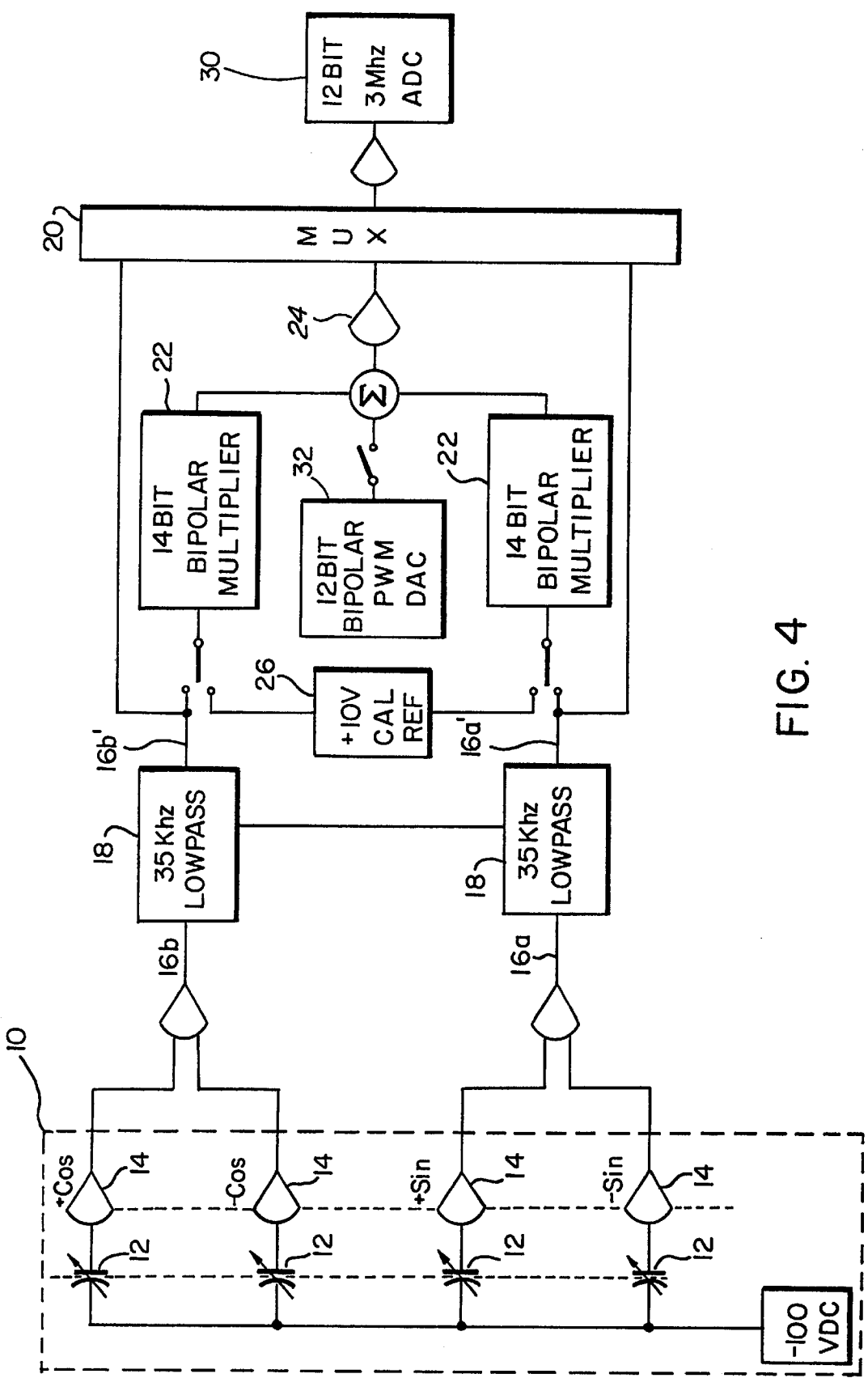
FIG. 4 is a schematic diagram of the present invention.

FIG. 4 shows a schematic of one preferred embodiment of the present invention, where the element 10 represents the hemispherical resonator and the capacitor elements 12 correspond to the pick-off electrodes. As the gap between the hemispherical resonator and the pick-off electrodes change due to the movement of the standing wave and the 2N resonator motion, the voltage across the capacitive elements vary linearly with gap displacement. The linearity is due to the fixed DC potential that maintains a fixed charge on the capacitors, and the very high impedance of the pickoff amplifiers 14 (approximately 1 Tohm at the gyro resonate frequency). The two sine waves are differenced, as in the prior art, into a resultant sine wave signal 16a. Similarly, the two cosine waves are differenced into a resultant cosine wave signal 16b. The two new signals correspond to the form $$A \cos (\theta_{actual}) \cos (\omega t) \quad \text{(I)}$$

$$A \sin (\theta_{actual}) \cos (\omega t), \quad \text{(II)}$$

where $\theta_{actual}$ represents the position of the standing wave relative to a fixed position on the gyroscope. The amplitude of the resultant signals thus carry information on the position of the standing wave with respect to a fixed position on the gyroscope. The object is to determine $\theta$ as accurately as possible from the two signals.

As one can readily discern, if $\theta$ is very small then the voltage signal amplitude corresponding to signal (I) will be much larger than the voltage signal amplitude of signal (II). Conversely, as $\theta$ approaches 90 degrees, the amplitude of signal (II) will be much larger than the amplitude of signal (I). The approach is to reduce as much noise as possible from a composite signal before attempting to solve for the standing wave angle.

The resultant signals 16a, 16b are initially filtered in a lowpass in a 35 Khz filter 18 and the filtered signals are delivered to a multiplexor 20. The multiplexor directs the filtered signals to a first path for one half of a cycle, and then switches to an open circuit during the second half of the cycle. The first half cycle is used to refine the estimate of the position of the standing wave, and the second half cycle is used to calibrate the components used in the estimate of the first half cycle.

The First Half Cycle

Figure 5:
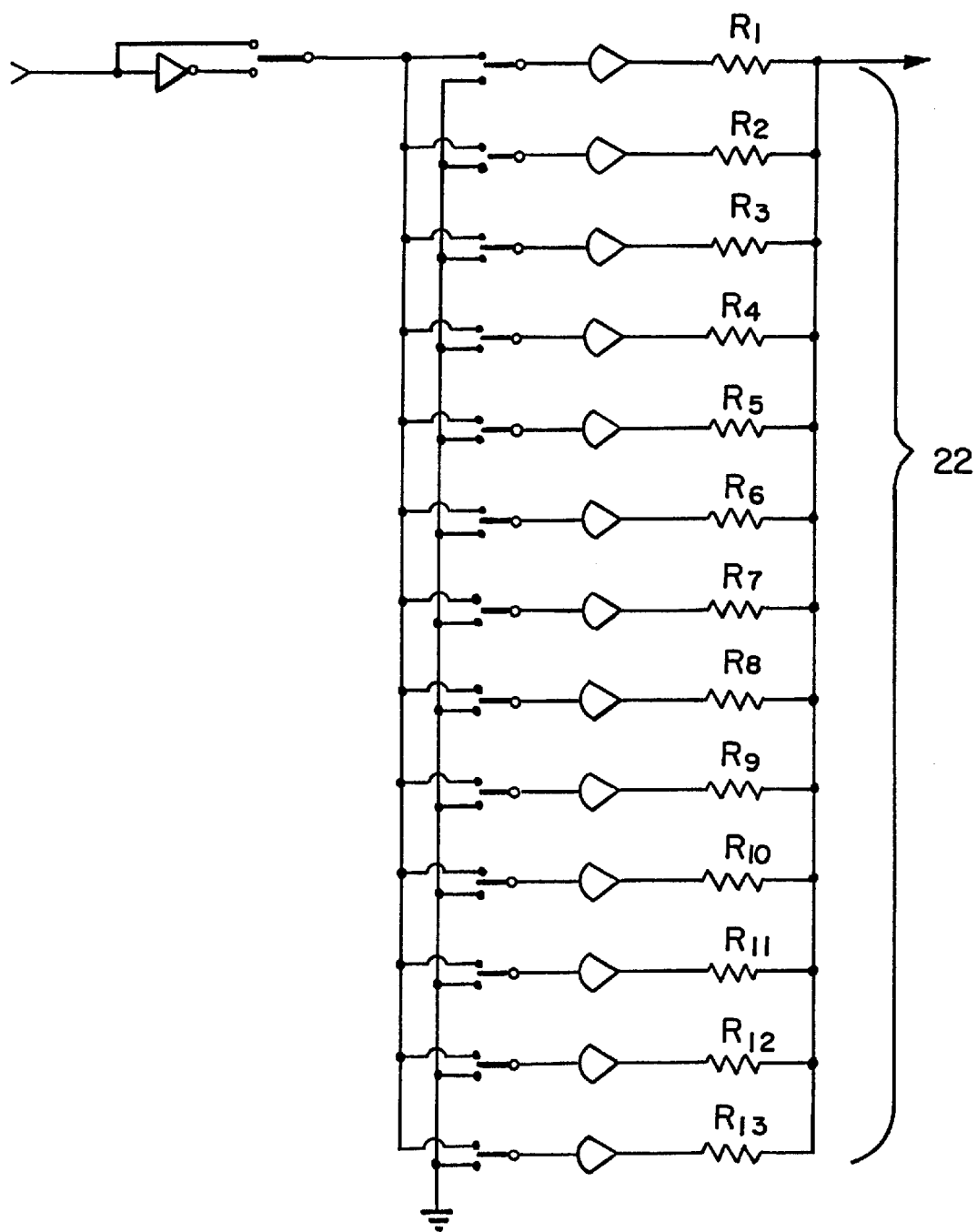
FIG. 5 is a schematic diagram of an example of a fourteen bit multiplier such as those of the present invention.

The two filtered signals 16a', 16b' are characterized by the expressions $A\cos(\theta)\cos(\omega t)$ and $A\sin(\theta)\cos(\omega t)$, where A is proportional to the total energy in the primary HRG resonance of frequency $\omega$ (approximately 4000 Hz). During the first half cycle, each of the two filtered signals 16a', 16b' are delivered to a separate digital-to-analog four quadrant multiplier 22 with a low noise specification, such as 8 nV/hz$^{1/2}$. FIG. 5 illustrates one digital-to-analog multiplier 22 which would satisfy the requirements of the present invention, although it is understood that there are many variations which would work equally well and the invention is not embodied by the type of multiplier illustrated therein. FIG. 5 shows a resistor ladder with thirteen resistors $R_{1-13}$ in parallel, each successive resistor having a resistance double of the previous resistor. The maximum root mean square power of the multiplier shown in FIG. 5 is given by $1.41*10^{2/(r/4)}$. A typical multiplying DAC could be used in the present invention if it possessed a low enough noise and total harmonic distortion specification (154 dB s/n). To achieve this level of performance, the multiplying DAC could be fabricated with available discrete switches, low noise operational amplifiers if required for switch impedance considerations, and short term stable, low noise resistors.

One multiplier 22 receives signal 16b' and multiplies the signal by a factor of $\cos(\theta_{estimate})$ while the second multiplier 22 receives signal 16a' and multiplies the signal by a factor of $-\sin(\theta_{estimate})$. The two signals are summed, and the resulting signal is given by the equation:

$$V = A \cos(\omega t) \sin(\theta_{actual} - \theta_{estimate})$$

where all the variables are known except for $\theta_{actual}$. The factor "$\sin(\theta_{actual} - \theta_{estimate})$" approaches zero as the estimate of the standing wave angle approaches the actual angle. By minimizing the signal, the residual can be amplified using a high gain amplifier 24 prior to the ADC.

The amplification of the signal prior to the ADC is made possible because the multipliers enable the signal to be evaluated at very small voltages without a loss of precision. The signal is amplified and digitally burst sampled in an analog-to-digital converter 30 having a net conversion rate of 80 kHz. A microprocessor (not shown) calculates $\theta_{actual}$ and substitutes this value for $\theta_{estimate}$ for the following cycle. In addition, the microprocessor also estimates the rate of change of $\theta_{actual}$ to eliminate standoff errors in the presence of constant rate.

As mentioned above, the factor "$\sin(\theta_{actual} - \theta_{estimate})$" becomes small very quickly, reducing the signal to a low power. This minimization of the signal prior to amplification and conversion is important because it eliminates much of the limitations of the conventional A/D converter. The processing algorithm in the microprocessor selects a $\theta_{estimate}$ that minimizes the signal sensed by the A/D converter. An iterative process will quickly converge to the desired accuracy of $\theta_{actual}$. A 23 bit resolution in this example is realized by the equivalent 11 bit gain prior to the A/D converter and the 12 bit resolution in the A/D converter.

The Second Half Cycle

The accuracy and noise of the invention is dominated by the accuracy and noise of the digital-to-analog multipliers 22. To prevent errors due to the drift of the multipliers, the accuracy of the multipliers is calibrated with the pulse width modulator DAC converter 32 during second half of the cycle. That is, a reference voltage signal 26 is delivered to the multipliers 22 in the second half of the cycle to evaluate the presence of drift or degradation of the multiplier 22. The digitally burst reference signal has a theoretical resultant product which is compared with the actual signal output from the multipliers. If any deviation in the signal from the theoretical signal is detected, the microprocessor adjusts the estimate of $\theta_{estimate}$ based on the most recent calibration of the multipliers. By continuously updating the estimated standing wave angle and monitoring the multipliers, the readout system can achieve accuracy up to 99.9999%.

The multipliers 22 are not inherently linear due to their discrete resistor and switch topology, but the multipliers do have a high bandwidth. Conversely, the pulse width modulator DAC 32 is inherently linear due to its time basis of operation, but has a limited bandwidth. The invention design allows for the calibration of the bias and scale factor of the pulse width modulator DAC.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A self-calibrating hemispherical resonator gyroscope including a plurality of forcing electrodes, a plurality of pick-off electrodes, and a thin-walled resonator adapted to establish a standing wave in the influence of a driving voltage, and where a position of the standing wave is characterized by two sinusoidal voltage signals, the hemispherical resonator gyroscope comprising:

a first multiplier for receiving a first sinusoidal signal and a second multiplier for receiving a second sinusoidal signal, where said first and second multipliers combine the respective sinusoidal signals with an estimated sinusoidal function of the standing wave position, said estimated sinusoidal functions selected so as to minimize the resultant signal when the output from said first and second multipliers are summed;

summation means for summing the output from the first and second multipliers;

a high gain amplifier for receiving the summed output from the first and second multipliers and amplifying the summed output;

an analog-to-digital converter for receiving the amplified summed output from the high gain amplifier;

a microprocessing for receiving the output from the analog-to-digital converter, and for evaluating the measured standing wave angle based on the output, said microprocessor further computing a new estimate of the standing wave position for use in a subsequent cycle and communicating new estimated sinusoidal functions to said first and second multipliers;

a known reference signal generator connected to said first and second multipliers to generate multiplier calibration signals, said known reference signal generator delivering a known reference signal to said first and second multipliers during an off cycle when the multipliers are not receiving the first and second sinusoidal signals such that an output of said multipliers in response to said known reference signal generates the calibration signal; and wherein the microprocessor further receives the calibration signals and adjusts the estimated standing wave angle based on a comparison between the calibration signals from said first and second multipliers and a predicted calibration signal.

2. A vibratory sensor comprising:

a thin-walled resonator;

a plurality of forcing electrodes;

a plurality of pick-off electrodes spaced about a periphery of said thin-walled resonator;

means for converting a plurality of voltage signals representative of a distance between said pick-off electrodes and said resonator into first and second sinusoidal signals;

a first multiplier for multiplying the first sinusoidal signal by a function of an estimated precess angle of a resonator standing wave, and a second multiplier for multiplying the second sinusoidal signal by a function of the estimated precess angle of the resonator standing wave;

a multiplexor for combining the output of the first and second multipliers to generate a single sinusoidal function multiplied by an error function between the estimated precess angle and an actual precess angle; and microprocessor means for minimizing the error function to converge the estimated precess angle to the actual precess angle.

3. The vibratory sensor of claim 2 further comprising a pulse width modulator and a source of a reference voltage signal, wherein the reference voltage signal is supplied to said first and second multipliers during an off cycle and the output of said first and second multipliers is combined with said pulse width modulator signal, and the product signal is compared to a predicted signal based on said reference voltage signal to calibrate said first and second multipliers.

4. An improved whole angle hemispherical resonator gyroscope of the kind having a thin-walled resonator, a plurality of forcing electrodes, and a plurality of pick-off electrodes for detecting the position of a resonator standing wave, where the position of the standing wave is characterized by signal comprising a sine function of the measured standing wave position multiplied by a sinusoidal function characterized by a driving signal, and a cosine function of the measured standing wave position multiplied by the sinusoidal function characterized by the driving signal, said improved hemispherical resonator gyroscope comprising:

first and second multiplying digital-to-analog converters (DACs) each positioned to receive one of the characterizing signals, said multiplying DACs connected to a microprocessor supplying an estimated sinusoidal function of the standing wave position where the estimated sinusoidal function is chosen such that, when the characterizing signals are multiplied by the estimated sinusoidal functions and then summed, the resultant signal approaches a minimum when the estimated standing wave position approaches the measured standing wave position; and an analog to digital converter for converting the resultant signal after amplifying the signal with a high gain amplifier.

5. The improved whole angle hemispherical resonator gyroscope of claim 4 further comprising:

a source for a calibrating reference voltage signal connected to the first and second multiplying DACs, where the reference voltage signal is delivered to the first and second DACs cyclically when said first and second DACs are not receiving the characterizing signals to generate first and second multiplier calibration signals; and a pulse width modulator communicating with said multiplying DACs, said pulse width modulator sending a periodic signal which is combined with said multiplier reference signals; where said improved whole angle hemispherical gyroscope evaluates the multiplier reference signals and adjusts the estimation of the standing wave position based on said evaluation.

6. A method for reducing noise while improving precision in a vibratory sensor comprising the steps of:

converting voltage signals determined by a position of a standing wave precessing within said sensor, into first and second characterizing signals comprised of a sine function of a precess angle multiplied by a driving function, and a cosine function of the precess angle multiplied by the driving function;

filtering the characterizing signals in a lowpass filter; and during a first half of an operating cycle:

multiplying the characterizing signals by a sinusoidal function of an estimated precess angle, where the sinusoidal function of the estimated precess angle is selected such as to minimize the sum of the characterizing signals after the summation;

summing the characterizing signals into a single precess angle estimation signal;

amplifying the precess angle estimation signal;

converting the precess angle estimation signal to an analog signal using a analog-to-digital converter;

estimating the precess angle from the converted precess angle estimation signal; and during a second half of the operating cycle:

calibrating the multiplying step in the first half cycle with a known voltage signal;

converting the calibration signal using a twelve bit digital to analog converter;

amplifying the converted calibration signal;

converting the amplified calibration signal back to analog using the analog-to-digital converter of the first half cycle;

evaluating the difference between an expected calibration signal and an actual calibration signal; and revising the estimation of the process angle using the evaluation of the calibration signal in the previous step.

7. A low noise resolver to digital converter comprising:

a pair of sinusoidal amplifiers for generating a sinusoidal signal corresponding to a voltage input signal;

a multiplier for causing the sinusoidal signal to be multiplied by a value corresponding to a second sinusoidal signal evaluated at an estimated target variable during a first portion of a cycle, where the product of the sinusoidal signal and the second sinusoidal signal evaluated at an estimated target variable is evaluated against a measured value;

means for updated the estimated target value based on a comparison of the measured value with said product; and a calibrating pulse width modulator for calibrating the multiplier during a second portion of the cycle.

8. A self-calibrating vibratory sensor comprising:

an oscillating member carrying an electrical charge;

a plurality of electrodes spaced from said oscillating member, said electrodes positioned to measure a displacement between said oscillating member and said electrodes and transmit an electrical signal corresponding to a displacement between said electrode and said oscillating member;

a signal processor for multiplying the electrical signal by a known function of the displacement between said electrode and said oscillating member, comparing the resultant output with a predicted output, and optimizing the predicted output based on the comparison; and a calibration component for calibrating the optimization of the predicted output by comparing a multiplication of a known signal by the function used in the signal processor.

9. The self-calibrating vibratory sensor or claim 8 further comprising a pair of four quadrant multipliers for multiplying the electrical signal by the known function.

10. The self-calibrating vibratory sensor of claim 9 wherein the calibration component includes a pulse width modulator and a means for generating a known voltage signal.

11. The self-calibrating vibratory sensor of claim 8 wherein said known function is a summation of trigonometric functions.

12. The self-calibration vibratory sensor of claim 8, wherein said oscillating member is a resonating shell in a hemispherical resonator gyroscope.

13. The self-calibration vibratory sensor of claim 12, wherein said plurality of electrodes are equally spaced about the periphery of the resonating shell and uniformly spaced from said resonating shell when said resonating shell is not oscillating.

14. The self-calibrating vibratory sensor of claim 13, comprising four of said plurality of electrodes corresponding to two sine functions and two cosine functions.

15. The self-calibrating vibratory sensor of claim 14 further comprising a switch for dividing an operation of the sensor into two periods, a first period for comparing the electrical signal with a known signal, and a second period for calibrating the sensor.

16. The self-calibration vibratory sensor of claim 15, further including an amplifier to amplify a difference between the product of the multiplication of the known function with the electrical signal, and the multiplication of the known function with the predicted output.

17. The self-calibration vibratory sensor of claim 16, wherein the multiplication by the known function is achieved with a resistance ladder accounting for at least fourteen bits.

18. The self-calibration vibratory sensor of claim 17, wherein the calibration component includes a pulse width modulator having at least a twelve bit capability.

19. The self-calibration vibratory sensor of claim 18 further comprising an analog to digital converter having at least a twelve bit capability.

20. The self-calibration vibratory sensor of claim 8 wherein the oscillating member comprises a hemispherical shell resonating such that a rim of said shell undergoes displacement in a sinusoidal manner, and wherein a cycle of operation of said sensor is divided equally between a half cycle to measure the position of the rim with respect to said electrodes, and a second half cycle for calibrating the measurement of the first half cycle.

* * * * *